(12) United States Patent
Inokuchi et al.

(10) Patent No.: US 7,410,721 B2
(45) Date of Patent: Aug. 12, 2008

(54) POSITIVE ELECTRODE CURRENT COLLECTOR AND MANGANESE DRY BATTERY USING THE SAME

(75) Inventors: Koji Inokuchi, Ashiya (JP); Keiji Ogino, Katano (JP); Hajime Murakami, Kishiwada (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 230 days.

(21) Appl. No.: 10/509,747

(22) PCT Filed: Mar. 12, 2003

(86) PCT No.: PCT/JP03/02963

§ 371 (c)(1),
(2), (4) Date: Sep. 30, 2004

(87) PCT Pub. No.: WO03/083962

PCT Pub. Date: Oct. 9, 2003

(65) Prior Publication Data

US 2005/0130038 A1 Jun. 16, 2005

(30) Foreign Application Priority Data

Apr. 1, 2002 (JP) ............................. 2002-098889

(51) Int. Cl.
*H01M 6/00* (2006.01)
*H01M 4/00* (2006.01)
*H01M 2/16* (2006.01)

(52) U.S. Cl. ..................... 429/122; 429/128; 429/137; 429/209

(58) Field of Classification Search .................. 429/122, 429/188, 164, 209, 128
See application file for complete search history.

(56) References Cited

U.S. PATENT DOCUMENTS

| 3,179,537 A | 4/1965 | Reilly |
| 3,891,463 A | 6/1975 | Karobath et al. |
| 4,157,317 A * | 6/1979 | Nagasawa et al. ........... 252/511 |

FOREIGN PATENT DOCUMENTS

| JP | 63-168968 | 7/1988 |
| JP | 3-297063 | * 12/1991 |
| JP | 6-176763 | 6/1994 |
| JP | 07-272702 | * 10/1995 |
| JP | 2001-312093 | 11/2001 |

* cited by examiner

*Primary Examiner*—Patrick Ryan
*Assistant Examiner*—Helen Chu
(74) *Attorney, Agent, or Firm*—McDermott Will & Emery LLP

(57) ABSTRACT

The positive electrode current collector for a manganese dry battery of the present invention comprises a carbon rod, and either one of a paraffin wax containing hydrocarbon whose molecular weight is 300 to 500 and a microcrystalline wax containing hydrocarbon whose molecular weight is 500 to 800, which is impregnated into the carbon rod, is characterized in that the endothermic amount of the paraffin wax or the microcrystalline wax obtained by differential scanning calorimetry up to 45° C. is not more than 1.0 J/g.

This enables the manganese dry battery employing the positive electrode current collector of the present invention to keep its sealing performance in a good condition during high-temperature storage even with the use of a low-density carbon rod.

5 Claims, 1 Drawing Sheet

POSITIVE ELECTRODE CURRENT COLLECTOR AND MANGANESE DRY BATTERY USING THE SAME

TECHNICAL FIELD

The present invention relates to a manganese dry battery, and more specifically, to a positive electrode current collector for a manganese dry battery using a carbon rod.

BACKGROUND ART

The carbon rod used as the positive electrode current collector for a manganese dry battery conventionally has a number of fine pores through which air can flow into the battery. In order to check the flow of air, the carbon rod is impregnated with wax. In the case of a high-density carbon rod, it can be impregnated with a small amount of paraffin wax having a low melting point.

Therefore, when an obtained dry battery is stored at e.g. 45° C. for evaluation, it becomes possible to reduce the melting of a sealing agent resulting from eluted paraffin, thereby keeping the sealing performance of the battery in a good condition.

However, streamlining including cost reduction requires the use of a low-density carbon rod, which demands a larger amount of paraffin with which to be impregnated because a low-density carbon rod is highly porous. This increases the amount of paraffin wax to elute during the storage at 45° C., thereby inducing the sealing agent to melt, with the problem of sealing failure.

Therefore, it is an object of the present invention to provide a positive electrode current collector for a manganese dry battery which is freed from the above-mentioned problem and is capable of keeping the sealing performance of the battery in a good condition during high-temperature storage even with a low-density carbon rod.

DISCLOSURE OF INVENTION

The positive electrode current collector for a manganese dry battery of the present invention comprises a carbon rod, and either one of a paraffin wax containing hydrocarbon whose molecular weight is 300 to 500 and a microcrystalline wax containing hydrocarbon whose molecular weight is 500 to 800, which is impregnated into the carbon rod, is characterized in that the endothermic amount of the paraffin wax or the microcrystalline wax, which is obtained by differential scanning calorimetry at 20 to 45° C, is not more than 1.0 J/g.

It is preferable that the positive electrode current collector for a manganese dry battery satisfies the relational expression: $90<Y+50.5X<100$ wherein X is the density (g/cm$^3$) of the carbon rod, and Y is the entire endothermic amount (J/g) of the positive electrode current collector obtained by differential scanning calorimetry at 20 to 100° C., and Y>0.

It is preferable that the carbon rod has a density of 1.55 to 1.75 g/cm$^3$.

In the positive electrode current collector of the present invention, it is preferable that in the entire endothermic amount obtained by differential scanning calorimetry at 20 to 100° C., the endothermic amount obtained by differential scanning calorimetry at 20 to 55° C. is not more than 25%, and the endothermic amount obtained by differential scanning calorimetry at 20 to 60° C. is more than 25% and not more than 40%.

It is also preferable that in the entire endothermic amount obtained by differential scanning calorimetry at 20 to 100° C., the endothermic amount obtained by differential scanning calorimetry at 20 to 65° C. is more than 40% and not more than 70%.

The present invention also relates to a manganese dry battery employing the above-described positive electrode current collector.

While the novel features of the invention are set forth particularly in the appended claims, the invention, both as to organization and content, will be better understood and appreciated, along with other objects and features thereof, from the following detailed description taken in conjunction with the drawings.

BEST MODE FOR CARRYING OUT THE INVENTION

Figure 1:
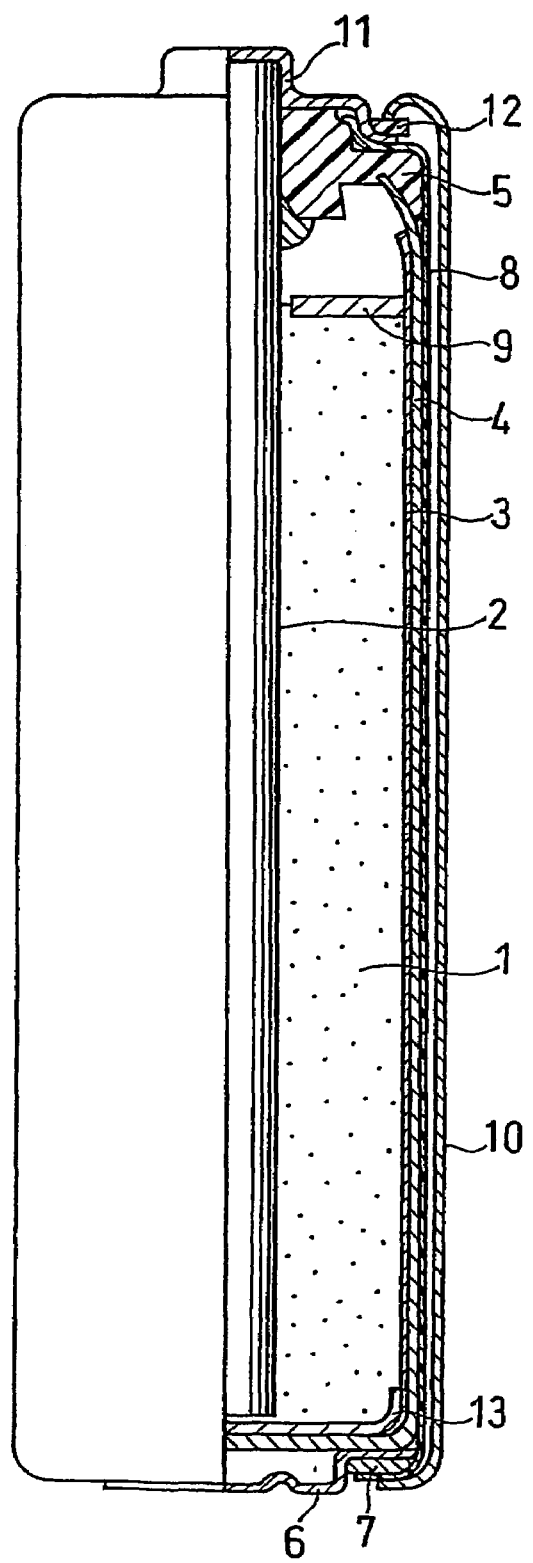
FIG. 1 is a front view showing a manganese dry battery in accordance with the present invention with a part cross section thereof.

The positive electrode current collector for a manganese dry battery of the present invention comprises a carbon rod and either one of a paraffin wax containing hydrocarbon whose molecular weight is 300 to 500 and a microcrystalline wax containing hydrocarbon whose molecular weight is 500 to 800, which is impregnated into the carbon rod, is characterized in that the endothermic amount of the paraffin wax or the microcrystalline wax obtained by differential scanning calorimetry at 20 to 45° C is not more than 1.0 J/g.

The greatest feature of the present invention is to use specific waxes to be impregnated into the carbon rod as described above, in order to maintain the sealing performance of an obtained battery even if a low-density carbon rod is employed.

It is necessary that the wax to be used in the present invention has an the endothermic amount, which is obtained by differential scanning calorimetry up to 45° C., of not more than 1.0 J/g by considering that the obtained dry battery is stored at 45° C. to evaluate its properties. This is because the endothermic amount over 1.0 J/g tends to elute more wax from the carbon rod at a temperature of 45° C., inducing the sealing agent to melt.

It is preferable that the positive electrode current collector satisfies the relational expression: $90<Y+50.5X<100$ wherein X is the density (g/cm$^3$) of the carbon rod, and Y is the entire endothermic amount (J/g) of the positive electrode current collector obtained by differential scanning calorimetry at 20 to 100° C., and Y>0.

In the positive electrode current collector, it is preferable that in the entire endothermic amount obtained by differential scanning calorimetry at 20 to 100° C., the endothermic amount obtained by differential scanning calorimetry at 20 to 55° C. is not more than 25%, and the endothermic amount obtained by differential scanning calorimetry at 20 to 60° C. is more than 25% and not more than 40%.

Moreover, it is preferable that in the entire endothermic amount obtained by differential scanning calorimetry at 20 to 100° C., the endothermic amount obtained by differential scanning calorimetry at 20 to 65° C. is more than 40% and not more than 70%.

First, as for the wax to satisfy the above requirements, a paraffin wax comprising hydrocarbon whose molecular weight is 300 to 500 containing normal paraffin can be used.

It is more preferable that the molecular weight is 400 to 500 because it raises the melting point and lessens the elution of the paraffin wax at 45° C.

As for hydrocarbon whose molecular weight is 300 to 500, normal paraffin having a carbon number of about 20 to 40 is employed.

Above all, the paraffin wax containing about 90 wt% of normal paraffin as the main component is preferably used.

It is preferable that the melting point of the above-mentioned paraffin wax is 60 to 75° C. from the viewpoint that the wax less elutes on the low-temperature side.

As the paraffin wax to satisfy the above requirements, for example, 155° F. paraffin wax manufactured by Nippon Seiro Co., Ltd and the like can be preferably used.

Second, the microcrystalline wax comprising hydrocarbon whose molecular weight is 500 to 800 containing isoparaffin and cycloparaffin can be used. It is more preferable that the molecular weight is 500 to 600 because the wax having such a molecular weight is easily impregnated into the carbon rod.

As for the above-mentioned hydrocarbon having a molecular weight of 500 to 800, for example, isoparaffin and cycloparaffin having a carbon number of around 30 to 60, and the like are employed.

Above all, it is preferable to use the microcrystalline wax containing a total of 85 to 90 wt% of isoparaffin and cycloparaffin as the main component because the wax less elutes on the low-temperature side.

For example, Hi-Mic-1045 manufactured by Nippon Seiro Co., Ltd., and the like can be used.

The melting point of the above-mentioned microcrystalline wax is preferably 65 to 80° C. because the wax having such a melting point is easily impregnated into the carbon rod and the wax less elutes on the low-temperature side.

The density of the carbon rod used in the present invention, which can be in the range of 1.55 to 1.75 g/cm$^3$, is more preferably as low as 1.55 to 1.65 g/cm$^3$. Impregnating the aforementioned waxes into such a low-density carbon rod can prevent the wax from eluting and the sealing performance from deteriorating.

The carbon rod can be either manufactured by the normal method or commercially obtained. For example, the carbon rod can be obtained by kneading graphite, pitch as a binder, and the like, and by forming them into a rod by extrusion. The wax can be impregnated into the carbon rod by the conventional method.

The positive electrode current collector of the present invention can be obtained by impregnating wax into the carbon rod by the above-mentioned method. Moreover, the use of such a positive electrode current collector can provide a manganese dry battery with the excellent sealing performance by the normal method. In other words, the elution of paraffin wax itself can be reduced, and particularly when polybutene is used as the sealing agent of the dry battery, polybutene and paraffin wax can be prevented from melting each other.

The following is a detailed description of the present invention by means of examples; however, the present invention is not restricted to them.

EXAMPLE 1

A high-grade carbon rod with as high a density as 1.68 g/cm$^3$ was obtained by kneading graphite and pitch as a binder and forming them into a rod by extrusion. The carbon rod was impregnated with a paraffin wax (manufactured by Nippon Seiro Co., Ltd.) having an average molecular weight of 389 and a melting point of 135° F. so as to obtain a positive electrode current collector of the present invention. With this positive electrode current collector, a R6 manganese dry battery was manufactured. In the manufacturing of the battery, polybutene was used as the sealing agent.

The front view of the R6 manganese dry battery manufactured in this example with a partial section is shown in FIG. 1.

A negative electrode zinc can 4 was obtained by forming metal zinc into a cylinder with a bottom, and a cylindrical positive electrode mixture agent 1 was housed in the can via a separator 3. Into the center of the positive electrode mixture agent 1 was inserted the obtained positive electrode current collector 2. The positive electrode mixture agent 1 and the negative electrode zinc can 4 were isolated by the separator 3. The positive electrode mixture agent 1 was obtained by mixing manganese dioxide, conductive carbon black, and an electrolyte composed of 30 parts by weight of zinc chloride and 70 parts by weight of water in a weight ratio of 50:10:40.

A sealing member 5 was made from a polyolefin-based resin, and a hole to insert the positive electrode current collector 2 was provided in its center. A brim paper 9 was obtained by stamping hard paper into a disk shape and was disposed on top of the positive electrode mixture agent 1. The sealing member 5 and the positive electrode current collector 2 penetrating the center hole of the brim paper 9 were so arranged that their tops were in contact with the positive electrode terminal 11, thereby being capable of acting as the positive electrode current collector.

Outside the negative electrode zinc can 4 was provided a resin tube 8 made of a heat-shrinkable resin film to secure insulation. The top end and the bottom end of the resin tube 8 cover the outer top surface of the sealing member 5 and the bottom surface of the sealing ring 7, respectively.

The positive electrode terminal 11 made of a tin plate was so shaped as to have a cap-like center portion which covers the top of the positive electrode current collector 2, and a flat brim portion. On the flat brim portion of the positive electrode terminal 11 is provided an insulating ring 12 made from a resin. Between the bottom of the positive electrode mixture agent 1 and the negative electrode zinc can 4 was disposed a bottom paper 13 to secure insulation. A sealing ring 7 is disposed on the outer surface side of the flat external portion of the negative electrode terminal 6.

A metal outer can 10 made of a cylindrical tin plate was disposed outside the resin tube 8. The bottom end of the can was bent inwardly and the top end thereof was curled inwardly and then the tip of the top end got in contact with the insulating ring 12. In this manner, the insulating ring 12, the flat brim portion of the positive electrode terminal 11, the top end of the resin tube 8, the outer surface of the sealing member 5, the opening end of the negative electrode zinc can 4, the bottom end of the resin tube 8, the sealing ring 7, and the negative electrode terminal 6 were fixed in the predetermined positions.

[Evaluation]

The endothermic amount of the obtained positive electrode current collector in the temperature range of 20 to 100° C. was measured by differential scanning calorimetry (DSC). In the entire endothermic amount at 20 to 100° C., the percentage of the endothermic amount at 20 to 45° C. was not more than 5%, and the percentage of the endothermic amount at 20 to 50° C. was more than 5% and not more than 15%. The percentage of the endothermic amount at 20 to 55° C. was more than 15% and not more than 25%; the percentage of the endothermic amount at 20 to 60° C. was more than 25% and not more than 40%; and the percentage of the endothermic amount at 20 to 65° C. was more than 40% and not more than 70%.

Moreover, forty such manganese dry batteries were prepared. The voltage of each battery was measured immediately after it was assembled, and then measured again after three-month storage at 45° C. The average values of the differences (voltage drops) between the voltages immediately after the assembly and the voltages after the storage at 45° C. were found.

Further, the batteries after the three-month storage at 45° C. were subjected to a pulse discharge test under the load of 1.8 Ω in which a 15-second discharge and a 45-second rest were alternately repeated until 0.9V.

The results of the evaluation were shown in Table 1.

EXAMPLES 2, 3 AND COMPARATIVE EXAMPLE 1

Three kinds of R6 manganese dry batteries were prepared in the same manner as in Example 1 except that the carbon rods of different densities and the waxes shown in Table 1 were combined. Then, the positive electrode current collectors and dry batteries obtained were subjected to the same evaluation as in Example 1, and the results of the evaluation were shown in Table 1.

The waxes used for the evaluation are 135° F. paraffin wax (average molecular weight: 389) manufactured by Nippon Seiro Co., Ltd., 145° F. paraffin wax (average molecular weight: 431) manufactured by Nippon Petrochemical Co., Ltd., and 155° F. paraffin wax (average molecular weight: 472) manufactured by Nippon Seiro Co., Ltd.

performance than the battery of Comparative example 1. Thus, the batteries in Examples 2 and 3 keep the sealing performance in a good condition during high-temperature storage.

Industrial Applicability

As described above, according to the present invention, it is possible to provide a positive electrode current collector for use in a manganese dry battery capable of keeping the sealing performance of the battery in a good condition during high-temperature storage even with the use of a low-density carbon rod.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode current collector for a manganese dry battery comprising: a carbon rod; and either one of a paraffin wax containing hydrocarbon whose molecular weight is 300 to 500 and a microcrystalline wax containing hydrocarbon whose molecular weight is 500 to 800, which is impregnated into said carbon rod, wherein only said wax is impregnated into said carbon rod, characterized in that the endothermic amount of said paraffin wax or said microcrystalline wax per 1 g of said

TABLE 1

| | Carbon grade | Carbon rod density (g/cm$^3$) | Paraffin wax | Endothermic amount up to 45° C. (J/g) | Entire endothermic amount (J/g) | Average value of voltage drop (mV) | Discharge performance (cycle) |
|---|---|---|---|---|---|---|---|
| Example 1 | High | 1.68 | 135° F. | 0.80 | 10.2 | 23 | 145 |
| Example 2 | Low | 1.65 | 145° F. | 0.05 | 12.2 | 21 | 140 |
| Example 3 | Low | 1.65 | 155° F. | 0.02 | 11.2 | 20 | 143 |
| Comparative Example 1 | Low | 1.65 | 135° F. | 1.40 | 12.4 | 37 | 128 |

In Example 1, the carbon rod has a high density. Therefore, in spite of the use of 135° F. paraffin wax having a lower melting point than the paraffin waxes used in Examples 2 and 3, the amount of impregnated paraffin wax is small, and the sealing performance of the battery is kept in a good condition after the storage at 45° C.

In Comparative example 1, however, the carbon rod is low in density and high in porosity. Therefore, the sealing performance of the battery deteriorates when the paraffin wax elutes during high-temperature storage. The sealing agent mainly composed of polybuten melts with the eluted paraffin wax, thereby decreasing effects as the sealing agent. It is considered that they facilitate the flow of air into the battery through fine pores of the carbon rod, thereby deteriorating the battery.

In contrast, the batteries in Examples 2 and 3 employ carbon rods whose densities are as low as in the battery of Comparative example 1. However, the use of the paraffin waxes of the present invention can provide a smaller voltage drop during the storage at 45° C. and more excellent discharge positive electrode current collector obtained by differential scanning calorimetry at 20 to 45° C. is not more than 1.0 J/g, and wherein said carbon rod has a density of 1.55 to 1.65 g/cm$^3$.

2. A positive electrode current collector for a manganese dry battery comprising: a carbon rod; and either one of a paraffin wax containing hydrocarbon whose molecular weight is 300 to 500 and a microcrystalline wax containing hydrocarbon whose molecular weight is 500 to 800, which is impregnated into said carbon rod, wherein only said wax is impregnated into said carbon rod, characterized in that the endothermic amount of said paraffin wax or said microcrystalline wax per 1 g of said positive electrode current collector obtained by differential scanning calorimetry at 20 to 45° C. is not more than 1.0 J/g, and by satisfying the relational expression:

$$90 < Y + 50.5X < 100$$

wherein X is the density (g/cm³) of said carbon rod, and Y is the entire endothermic amount (J/g) of said positive electrode current collector obtained by differential scanning calorimetry at 20 to 100° C., and Y>0, and wherein said carbon rod has a density of 1.55 to 1.65 g/cm³.

3. The positive electrode current collector for a manganese dry battery in accordance with claim 1, wherein in the entire endothermic amount of said positive electrode current collector obtained by differential scanning calorimetry at 20 to 100° C., the endothermic amount obtained by differential scanning calorimetry at 20 to 55° C. is not more than 25%, and the endothermic amount obtained by differential scanning calorimetry at 20 to 60° C. is more than 25% and not more than 40%.

4. The positive electrode current collector for a manganese dry battery in accordance with claim 3, wherein in the entire endothermic amount of said positive electrode current collector obtained by differential scanning calorimetry at 20 to 100° C., the endothermic amount obtained by differential scanning calorimetry at 20 to 65° C. is more than 40% and not more than 70%.

5. A manganese dry battery comprising a positive electrode current collector: said positive current collector comprising a carbon rod and either one of a paraffin wax containing hydrocarbon whose molecular weight is 300 to 500 and a microcrystalline wax containing hydrocarbon whose molecular weight is 500 to 800, which is impregnated into said carbon rod, wherein only said wax is impregnated into said carbon rod, characterized in that the endothermic amount of said paraffin wax or said microcrystalline wax per 1 g of said positive electrode current collector obtained by differential scanning calorimetry at 20 to 45° C. is not more than 1.0 J/g, and wherein said carbon rod has a density of 1.55 to 1.65 g/cm³.

* * * * *